United States Patent [19]

Mundel et al.

[11] 4,160,146

[45] Jul. 3, 1979

[54] METHOD FOR MAKING REINFORCING BASKETS FOR STEEL REINFORCED HOLLOW CONCRETE BODIES

[75] Inventors: Günter Mundel; Jean-Claude Poutet, both of Kehl, Fed. Rep. of Germany

[73] Assignee: Ed. Züblin Aktiengesellschaft, Stuttgart, Fed. Rep. of Germany

[21] Appl. No.: 814,428

[22] Filed: Jul. 11, 1977

[30] Foreign Application Priority Data

Jul. 13, 1976 [DE] Fed. Rep. of Germany ....... 2631501

[51] Int. Cl.² .............................................. B23K 11/06
[52] U.S. Cl. .......................................... 219/58; 219/56; 219/83
[58] Field of Search ............................. 219/58, 56, 83

[56] References Cited

U.S. PATENT DOCUMENTS

| | | | |
|---|---|---|---|
| 1,878,760 | 9/1932 | Cosgrove | 219/56 |
| 2,473,859 | 6/1949 | Butler | 219/58 X |
| 2,903,553 | 9/1959 | Butler | 219/56 |
| 3,579,259 | 5/1971 | Kato | 219/56 |
| 3,676,631 | 7/1972 | Ritter | 219/58 X |
| 3,692,970 | 9/1972 | Gott | 219/56 |

FOREIGN PATENT DOCUMENTS

| | | | |
|---|---|---|---|
| 38-17572 | 9/1963 | Japan | 219/56 |
| 431974 | 11/1974 | U.S.S.R. | 219/56 |

*Primary Examiner*—Richard R. Kucia
*Attorney, Agent, or Firm*—Becker & Becker, Inc.

[57] ABSTRACT

A method for making grids or baskets of reinforcing rod or wire, especially for use in the construction of hollow concrete bodies, in which a group of circumferentially spaced first rods or wires moving in the direction of the length thereof have a second rod, or wire, wrapped thereabout in a helical path; while electrodes are provided which rotate around the group of rods, or wires, and are operable to weld the rods, or wires, together at each point of intersection thereof by the combination of welding current and pressure, while relieving the pressure and interrupting the current while the electrodes are between the points of intersection.

7 Claims, 13 Drawing Figures

METHOD FOR MAKING REINFORCING BASKETS FOR STEEL REINFORCED HOLLOW CONCRETE BODIES

The present invention relates to a method for producing reinforcing baskets or cages for hollow bodies of steel concrete by resistance spot welding by means of a welding head which is moved relative to the reinforcing wires, the welding head comprising a welding electrode and a contact electrode. These electrodes are subjected to pressure in the direction toward the reinforcing wires while a plurality of reinforcing wires are welded to a connecting wire crossing the reinforcing wires, the welding electrode moving on the crossing connecting wire. The welding electrode through reinforcing wires crossing each other periodically electrically is connected to the contact electrode for a predetermined welding period.

According to a heretofore known device disclosed in German Offenlegungsschrift No. 1 752 908 for carrying out the above mentioned method, longitudinal wires are advanced by reinforcing baskets continuously in a position in which they are aligned to each other, and the connecting wire is helically applied to the longitudinal wires. The welding head which contains the two electrodes is rotated so that when the contact electrode moves onto a longitudinal wire, the contact between the electrodes is established and a welding current can flow for a predetermined welding period.

The strength of the welding connections is of particular importance for the load bearing capacity of the finished elements made of steel concrete. The manufacture of the concrete elements must provide that the reinforcing wires must be non-displaceable and rigid in order to assure their precise location within the concrete. Furthermore, the reinforcement must be able to withstand loads which during the stock keeping and after the installation act upon the finished elements of steel concrete. Therefore, the welding must have a high pull and shear resistance. For certain purposes of application of finished elements of steel concrete containing reinforcing mats or reinforcing baskets, it is furthermore necessary that the welding spots are able to withstand loads caused by vibration movements. According to modern building codes, such reinforcements must be subjected to fatigue vibration stress tests according to which samples of the reinforcements are at predetermined pull stresses subjected to vibrations with frequencies between 15 and 150 Hz. The duration of such tests extends each time over several hours.

In order to assure a sufficiently safe welding connection, a minimum contact pressure of the electrodes has to be applied. The pressure necessary for this purpose at which the electrodes are pressed against the parts to be welded may, however, cause deformations of the reinforcing wires because the wires to be interconnected rest on the welding spots only, and the welding electrode is guided on the connecting wire which within the region between the areas on which it rests may deform due to the pressure exerted upon the welding electrode. Moreover, when the contact electrode moves onto the reinforcing wire which is located transverse to the moving direction of the contact electrode, a high transfer resistance may be encountered because the contact pressure of the electrode becomes fully effective only after it has moved onto the wire. As a result thereof, between the contact electrode and the wire an undesired spark formation may occur at this spot which spark formation may result in a change in structure of the wire material. Such structural changes caused by a wire deformation and an undesired spark formation may harmfully affect the pull and bending strength of the wire.

It is, therefore, an object of the present invention to assure a sufficient contact pressure during the welding periods without deformation of the reinforcing wires by the pressure at which the electrodes are pressed against the wires.

This object and other objects and advantages of the invention will appear more clearly from the following specification in connection with the accompanying drawings, in which.

The problem underlying the present invention has been solved by subjecting the welding electrode during the intervals between the welding periods to the pressure necessary for establishing contact. According to a further development of the method according to the invention, the contact electrode is pressure-relieved synchronously with the welding electrode so that the pressure for pressing the electrode against the wires and establishing contact is applied only during the duration of the welding periods.

When producing reinforcing baskets for steel concrete pipes which are provided with muffs or bushings having an enlarged diameter, it is necessary in a continuous manner to spread the longitudinal wires of the reinforcement during their advance and subsequently to guide the longitudinal wires again in the direction toward the longitudinal axis of the reinforcing basket. As a result thereof, an inclined position of the longitudinal wires with regard to the longitudinal axis of the reinforcement basket is obtained so that the two electrodes have to be displaced relative to each other in the direction of the pressing-on pressure. In this way, the pressing-on pressure of the two electrodes will be of a different magnitude, and for one of the two electrodes a sufficient contact pressure is no longer assured. The method according to the present invention eliminates this drawback by controlling the contact pressure on both electrodes by means of a pressure equalizing system so that the contact pressure for both electrodes will be substantially the same.

The invention furthermore concerns carrying out the above described method of the invention. This consists primarily in that at least one of the two electrodes is displaceably mounted in the direction in which it is subjected to pressure and is coupled to a control element which is arranged in a pressure system to which the welding electrode is connected through the intervention of the control element. By means of this control element the welding electrode is relieved of its pressing-on pressure directly after leaving the welding spot. In this connection, the control element may be coupled to the contact electrode in such a way that a displacement of this electrode counter to the direction in which the pressure acts upon the electrode for establishing the contact pressure brings about the building up of the contact pressure by means of the control element.

Figure 1:
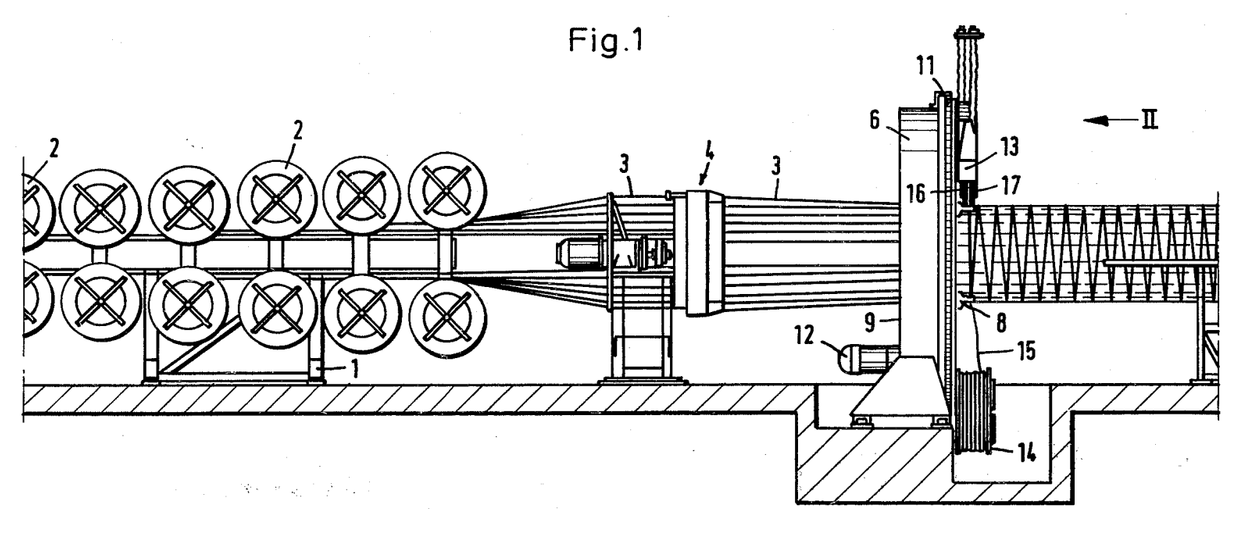
FIG. 1 diagrammatically and in side view shows a heretofore known machine for producing the reinforcing baskets in a continuous process.
Figure 2:
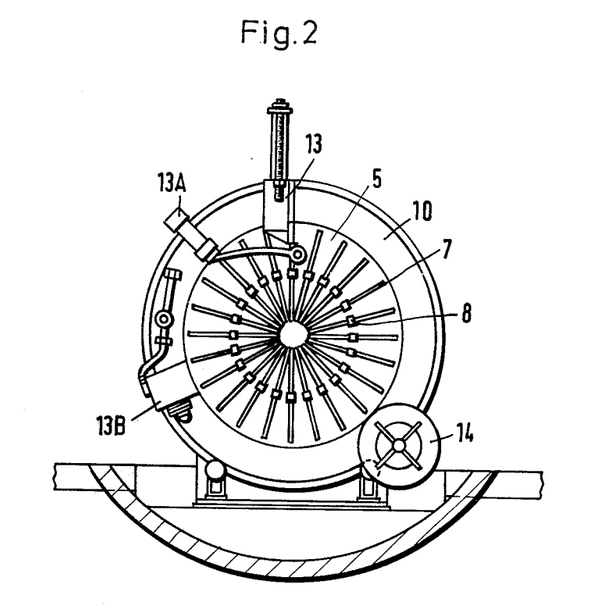
FIG. 2 is a view seen in the direction of the arrow II of FIG. 1.

Referring now to the drawings in detail, FIGS. 1 and 2 show a heretofore known machine for making reinforcing baskets. The machine has a coil stand 1 having arranged thereon four rows, each row having six coils 2 arranged adjacent and above each other. From these 24 coils, longitudinal wires 3 are withdrawn and passed through a wire advancing device 4 in which the wires are grasped by transport rollers and are advanced in a straightened-out position.

The wires are passed through a jig 5 which is arranged in the interior of a ring 6 and pertains to a stand 9. As will be evident from the end view of FIG. 2, the jig has provided therein radial slots 7. Radially displaceably mounted on said slots are guiding members 8. The longitudinal wires 3 are passed through said slots 7 and said guiding members 8.

On the ring 6 of stand 9 at the end face there is provided an annular disc 10 which is rotatably mounted. At the circumference of said disc 10 there is supported a gear ring 11 engaged by the driving gear of a transmission 12. Connected to the ring 10 is a welding head 13 which rotates together with the annular disc 10. Furthermore, a coil 14 is mounted on the annular disc 10 from which coil the wire 15 for the spiral surrounding the basket is withdrawn. Also mounted on annular disc 10 are a cooling unit 13B and a welding transformer 13A.

The guiding members 8 are adjustable in said slots in an infinitely variable manner so that the longitudinal wires can be spread outwardly and can again be moved together in inward direction in order to form conically or similarly widened muffs on the reinforcing baskets. This adjustment can be controlled automatically.

The welding head comprises two roller-shaped electrodes 16 and 17 and is so guided that during its circulation one of the electrodes moves on the helical wire 15, while the other electrode moves along adjacent the helical wire and each time within the region of a connecting point of the wires establishes the contact between the electrodes so that a welding current can flow. The welding electrode 17 moving on the helical wire 15 establishes the spot welding connection, whereas the running along contact electrode 16 serves for initiating the welding current.

Figure 3:
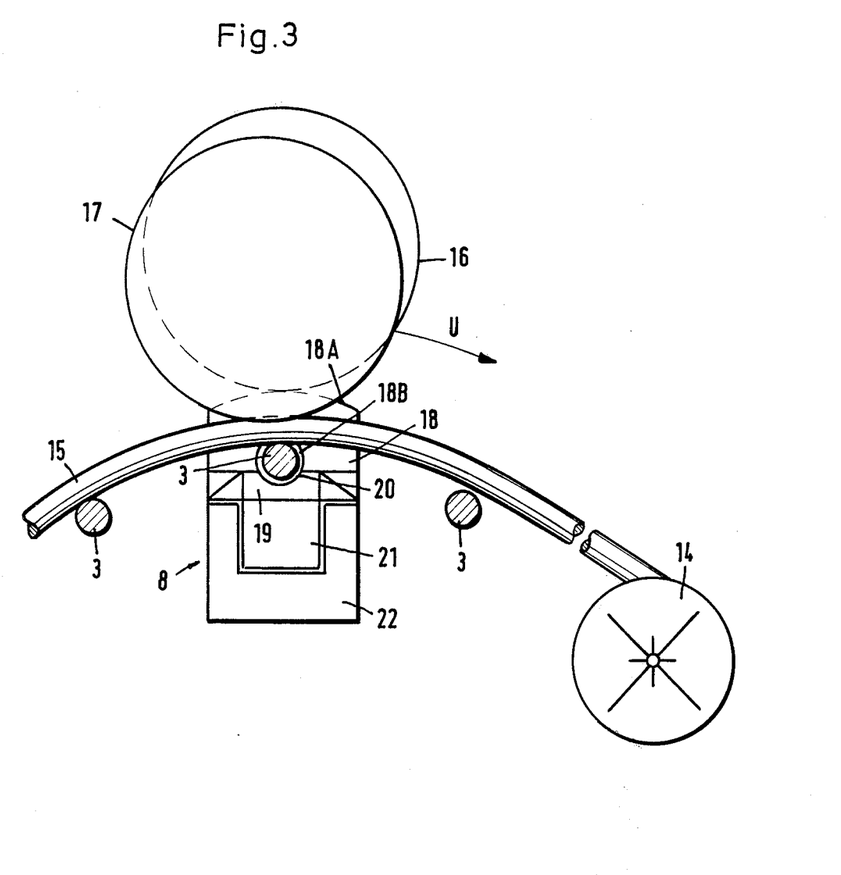
FIG. 3 diagrammatically illustrates on an enlarged scale the welding electrodes in operative position and seen in the same way as in FIG. 2.

FIG. 3 diagrammatically illustrates the position of the electrodes with regard to the reinforcing wires to be welded in the course of a welding period.

The helical wire 15 rolling off from the supply roll 14 is placed onto the longitudinal wires 3 and simultaneously is guided by the welding electrode 17. The contact electrode 16 is somewhat offset with regard to the welding electrode 17 so that it leads when viewed in the circulating direction U of the welding head and is located radially further outwardly than the welding electrode 17. The contact element 18 comprises a support 19 which comprises a groove-shaped recess 20 in which the longitudinal wire 3 is located. Within the region of the contact electrode 16, the longitudinal wire 3 is covered by the upper portion of the contact element 18. The surface 18A of the contact element 18 forms a guiding path for the contact electrode 16. In this region, the contact element 18 comprises a passage opening 18B for the longitudinal wire 3. The contact element 18 is together with the support 19 arranged on a sliding member 21 which is pivotally mounted in a support 22 of the guiding member 8.

FIGS. 4-8 illustrate electrodes in the moving direction of the welding head and also show the pertaining hydro-pneumatic control. For each electrode there is provided a working cylinder 23, 24. The electrode 17, 16 is rotatably mounted on the piston rod 23A and 24A of the cylinders 23 and 24 respectively. The working cylinders are double-acting and each comprises two pressure chambers 23B, 23C, 24B and 24C respectively which are separated from each other by the pistons 23D and 24D. The two pressure chambers 23C, and 24C of the two cylinders are interconnected by a conduit 25. The two pressure chambers 23B and 24B are likewise interconnected by a conduit 26 in which a valve 27 is arranged. From that portion of the conduit 26 which is connected to the pressure chamber 24B of cylinder 24, a conduit 28 leads into a control cylinder 29. In the control cylinder, a piston 29A is displaceable the piston rod 29 of which is provided with a head 29C by means of which the closing element 27A of valve 27 can be actuated. The chamber 29D of the control cylinder 29 which chamber is separated from the mouth of conduit 28 by the piston 29A, is through a conduit 30 in communication with a source of pressure 31 which is designed as a hydropneumatic pressure storage means. The pressure storage means comprises two chambers 31A and 31B which are separated from each other by a diaphragm 31B. The chamber 31B is filled by means of a gaseous medium, for instance nitrogen and is connected to a pressure gauge 32.

Figure 4:
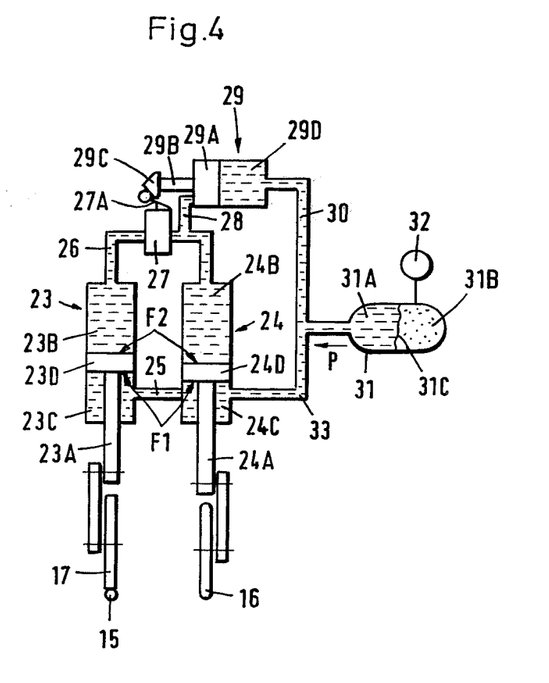
FIG. 4 diagrammatically shows on an enlarged scale the electrodes in a view according to FIG. 1 with hydropneumatic control in a position of the welding head between two longitudinal wires.

FIG. 4 shows the positions of the two electrodes when the welding head occupies a position between two longitudinal wires. The position of the welding electrode 17 is determined by the helical wire 15 on which said electrode 17 moves. The two interconnected chambers 23C and 24C of the working cylinders 23 and 24 are by means of a conduit 33 connected to the pressure storage means 31 and therefore are subjected to the pressure P from said pressure storage means 31. The same pressure also prevails in chamber 29D of the control cylinder 29. Inasmuch as the two piston surfaces F1 and F2 of the cylinder pistons 23D, 24D respectively are of different sizes, a lower pressure namely P (F1/F2) prevails in the two chambers 23B and 24B. The piston 29A of the cylinder 29 therefore occupies its FIG. 4 shown end position and in the illustrated position of the electrodes cannot be displaced. The valve 27 is blocked so that the piston 23D of cylinder 23 can even if the electrode 16 is freely suspended, not be displaced by the weight of said electrode 16. In the FIG. 4 position of the electrodes, the pressure system is in its equilibrium and the two electrodes are not subjected to the on-pressing pressure so that also the helical wire 15 which is exposed within the different region cannot be deformed by the pressure of the welding electrode 17.

Figure 5:
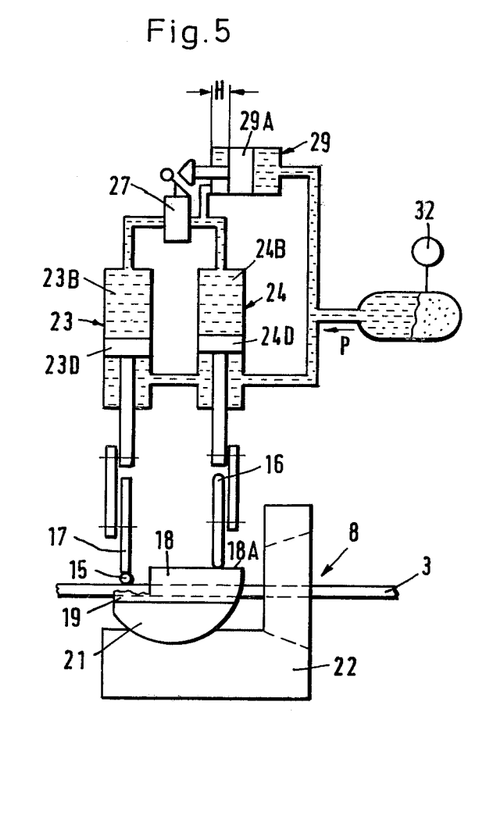
FIG. 5 is a view similar to that of FIG. 4 in operative position of the electroded with the longitudinal wires extending in horizontal direction.

FIG. 5 shows the position of the electrodes which they occupy during a welding operation. The contact electrode has moved onto the guiding path 18A of the contact element 18 and has therefore been displaced radially outwardly (in FIG. 5) in upward direction. The longitudinal wire 3 occupies a horizontal position so that the reinforcing basket is cylindrical in this working phase. In view of the displacement of the contact electrode 16, the piston 24D of the working cylinder 24 has been displaced upwardly whereby the pressure has risen in the chamber 24B. As a result thereof, liquid is displaced from the chamber 24B, and the piston 29A of the control cylinder 29 is displaced in conformity with the working stroke H. Consequently also the valve 27 will be opened so that the same pressure which prevails in chamber 24B of the working cylinder 24 will also prevail in chamber 23B of the working cylinder 23B. Since the welding electrode 17 is through the intervention of the helical wire 15 and longitudinal wire 3 supported by the support 19 of the contact element 18, the welding electrode 17 cannot move out of its illustrated position and by the pressure built up by the displacement of piston 24 is pressed against the helical wire 15 and the longitudinal wire 3. This pressure equals P (F2/F1). As soon as the contact electrode 16 leaves the guiding path 18A, it moves to its starting position (FIG. 4), and the welding electrode 17 is relieved from the welding pressure.

Figure 6:
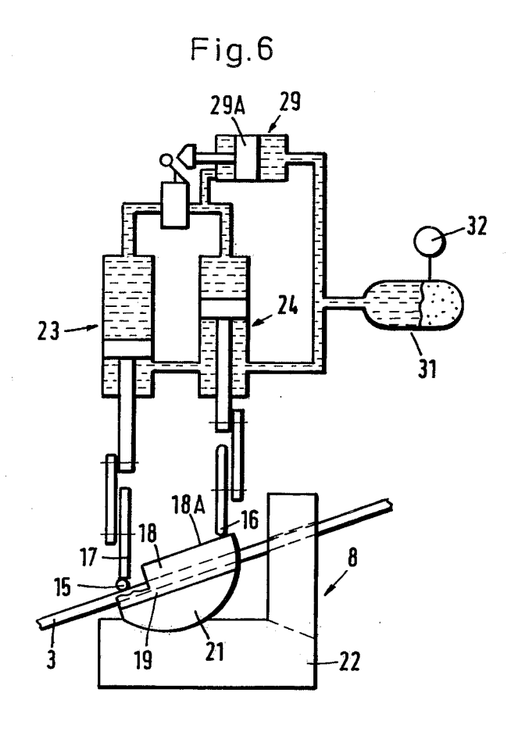
FIG. 6 represents a view according to FIG. 5 with the longitudinal wires extending in advancing direction and inclined outwardly.
Figure 7:
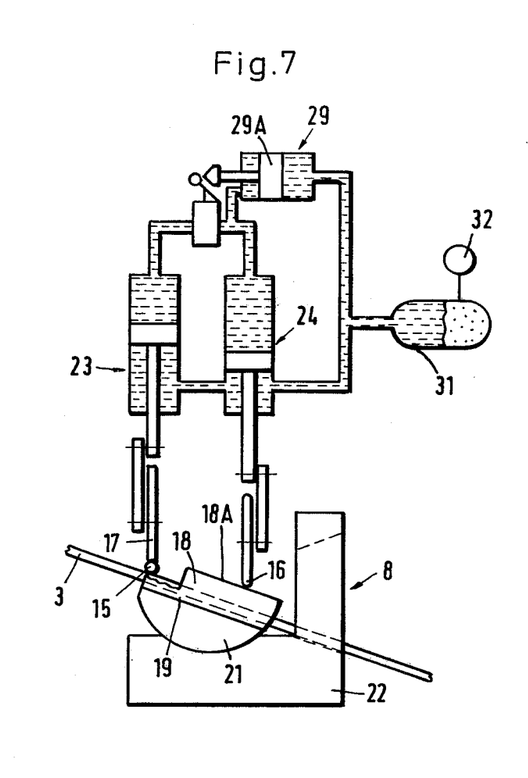
FIG. 7 is a view similar to that of FIG. 5 with the longitudinal wires extending in advancing direction and inclined inwardly.

In FIGS. 6 and 7 there are illustrated the two positions of the electrodes when the longitudinal wires 3 are inclined to the longitudinal axis of the reinforcing basket. FIG. 6 shows the position in which the longitudinal wires are spread radially outwardly, whereas FIG. 4 shows the reverse position. The spreading and return of the longitudinal wires is brought about by the automatically controlled radial displacement of the guiding members 8 into the slots 7 of the jig 5 (see FIG. 2). In view of the pivotable mounting of the sliding member 21 which carries the contact element 18, the longitudinal wire is supported by the entire longitudinal extension of the support 19. The difference in height between the guiding path 18A and the longitudinal wire 3 will at any rate bring about a displacement of the contact electrode 16 so that also when the longitudinal wires 3 are in an inclined position, the piston 29A of the control cylinder 29 will be displaced, and the valve 28 will be opened. The two working cylinders 23 and 24 are therefore interconnected during the respective welding period so that the electrodes 16 and 17 can in the direction in which they are subjected to pressure be displaced in opposite direction to each other whereby the difference in height can be compensated for, said difference in height being due to the inclined position of the longitudinal wires. The welding pressure will at any rate be determined by the displacement stroke of the contact electrode 16 which is dependent only on the difference in height between the guiding path 18A and the wire 3 so that independently of the inclined position of the longitudinal wires, during each welding period the same welding pressure will automatically be built up. This pressure can be adjusted at the pressure storage means 31 and can be monitored by means of the pressure gauge 32 and be kept constant.

Figure 8:
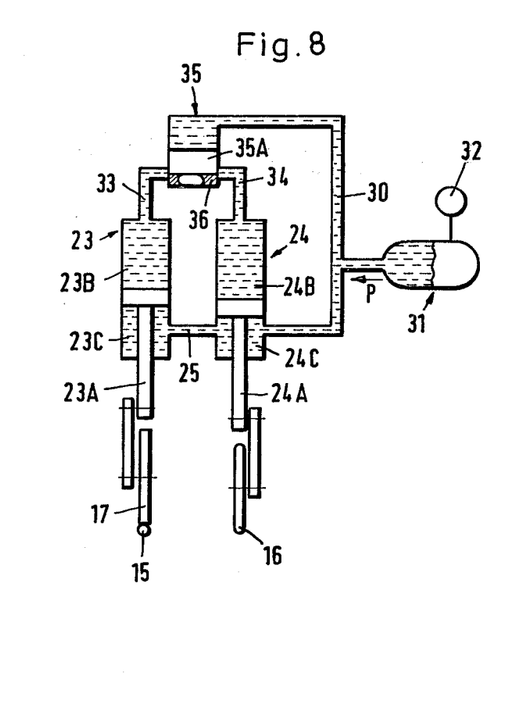
FIG. 8 is a view similar to that of FIG. 4 with a modified embodiment of the hydropneumatic control while the welding head occupies a position between two longitudinal wires.
Figure 9:
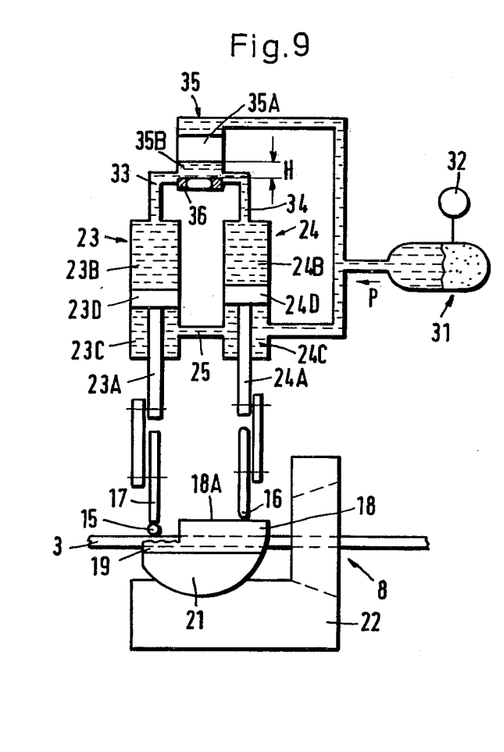
FIG. 9 is a view similar to that of FIG. 8 showing the electrodes in operative position and with the longitudinal wires occupying a horizontal position.

FIGS. 8 and 9 show a modification of the hydropneumatic control according to the invention. The two working cylinders 23 and 24 are through conduits 33 and 34 respectively connected to a control cylinder 35 in such a way that with regard to the piston of the control cylinder, they lead at the same height into the cylinder chamber 35B which is located on one side of the piston. In this chamber at the end face of the control cylinder 35 there is provided an annular shaped elastic seal 36, the remaining connections between the working cylinders, the pressure storage means and the control cylinder corresponding to those of the embodiment of FIGS. 4–7.

In the FIG. 8 position of the welding head, the welding head is located between two longitudinal wires, whereas in its FIG. 9 position, the electrodes have moved onto the contact element 18. These two positions coincide with the positions of the electrodes in FIGS. 4 and 5 respectively. Also the two positions with the longitudinal wires in inclined position as shown in FIGS. 6 and 7 are possible in the same manner and are therefore not again illustrated.

In FIG. 8, the hydraulic system is in its equilibrium because the pressure in the chambers 23B and 24B is less than in the chambers 23C and 24C as has been explained already in connection with FIG. 4. The piston 35A of the control cylinder 35 simultaneously serves as valve by means of which the connection between the conduits 33 and 34 and consequently between the chambers 23B and 24B is interrupted. As soon as the contact electrode 16 moves on the contact elements 18 the pressure in the chamber of 24B of the working cylinder 24B increases, and the seal 36 will under this pressure be deformed to such an extent that it frees the mouth of the conduit 34, and pressure fluid flows from the working cylinder 24 into the chamber 25B or interior cylinder 35. The annular design of the seal 36 is particularly suitable for the necessary deformation. By the pressure prevailing in the chamber 35B, the piston 35A is displaced by a distance H which corresponds to the stroke of the contact electrode 16. The two chambers 23B and 24B of the working cylinders are now interconnected through the intervention of the conduits 33 and 34 and the chamber 35B of the control cylinder. The pressure built up in the chamber 24B therefore also prevails in the chamber 23B and acts upon the piston 23D. By means of this pressure, the welding electrode 17 is pressed against the two wires 15 and 3 resting on the support 19 so that the required contact pressure is present.

As soon as the contact electrode 16 during the further circulation of the welding head leaves the guiding path 18A, the piston 35A of the control cylinder 35 is by the pressure P moved in the direction toward the seal 36. The abutting action of the piston is dampened by the seal 36 which at said abutment in view of its own elasticity can elastically be formed.

The hydraulic control may also by the two embodiments be modified in such a way that the connection between the two working cylinders 23 and 24 will be opened and closed by an electric or electronic control. To this end, instead of the described valve arrangement, or in addition thereto, a valve may be arranged in one of the connecting lines between the working cylinders. The closing element of said valve may be actuated electromagnetically. An electro valve of this or similar type may be actuated by the electronic control which is provided for determining the welding periods. To this control, the welding voltage is connected to both electrodes and is disconnected from the electrodes.

Figure 10:
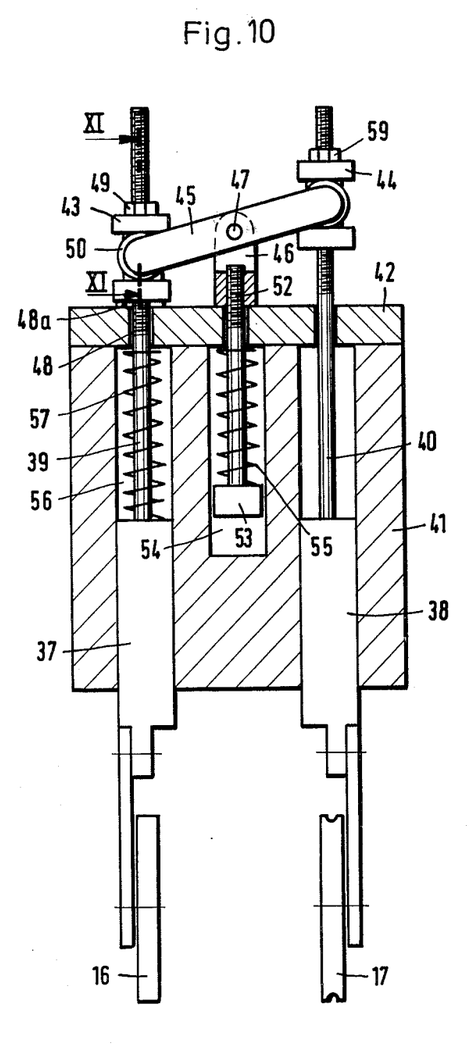
FIG. 10 shows a design of the welding head with mechanically coupled electrode in a view corresponding to that of FIG. 4.
Figure 11:
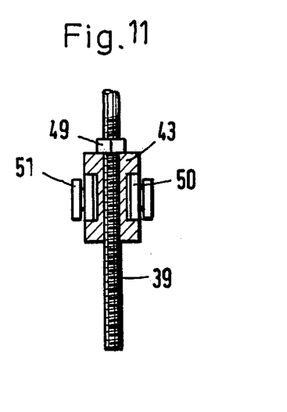
FIG. 11 represents a section taken along the line XI-XI of FIG. 10.
Figure 12:
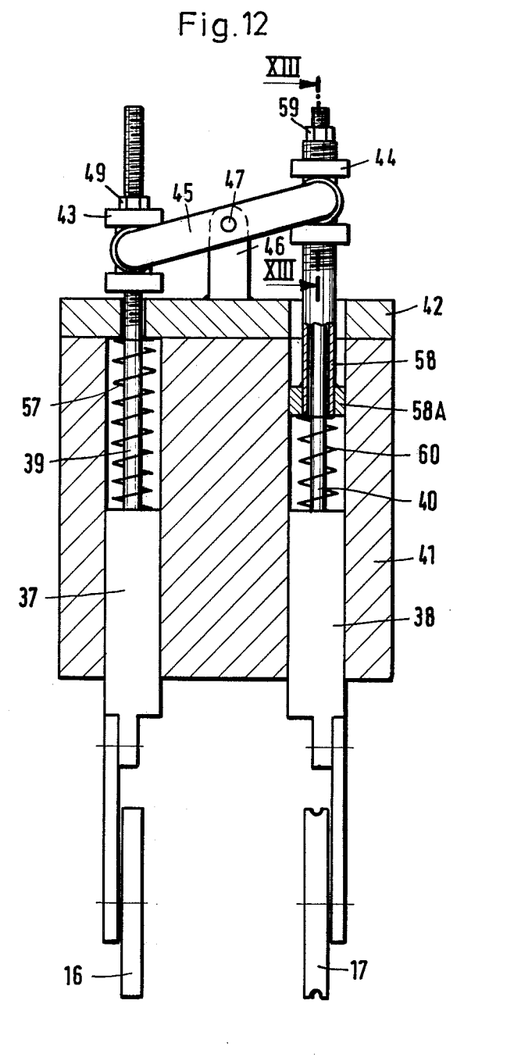
FIG. 12 illustrates another embodiment of the welding head with mechanically coupled electrode in a view similar to that of FIG. 10.

FIGS. 10-12 illustrate two embodiments of the device according to the invention with a mechanical coupling of the two electrodes.

As shown in FIG. 10, the two rotatably mounted electrodes 16 and 17 are respectively connected to a guiding rod 37, 38 which are respectively connected to connecting rods 39 and 40. The two guiding rods 37 and 38 are slideably displaceably mounted in housing 41 which is covered by a cover 52 having two bores for slide guiding the adjusting rods 39 and 40. A bearing 43 is outside the housing 41 connected to the connecting rod 39. A similarly designed bearing 44 is provided on the adjusting rod 40. The two bearings 43 and 44 are interconnected by a two-arm lever, the two ends of which pivotally engage the bearings 43 and 44. The lever 45 is pivotally mounted on a bearing block 46. The bearing area 47 on the bearing block 46 forms the pivot axis of the lever 45 and is located between the two adjusting rods 39 and 40. The pivot axis 47 extends perpendicularly to the longitudinal axes of the adjusting rods 39 and 40 which coincide with the longitudinal axes of the guiding rods 37 and 38. In the passage bore for the adjusting rod 39 there is located a bushing 48 which has an annular collar 48 resting on the cover 42 of the housing 41. This annular collar forms an abutment for the bearing 43 so that the movement of the contact electrode 16 in the direction of the outward movement of the guiding rod 37 is limited. The bearing 43 is screwed onto the connecting rod 39 and is fixed on the said rod by means of a counter nut 49. The lever 45 comprises two parallel rods the two ends of which are by means of two oppositely located joints 50, 51 linked to the bearing 43 (see FIG. 11). The bearing 44 and the joint of the lever 45 with said bearing are of the same design as the bearing 43 and the pertaining pivotal connection.

The bearing block 46 is screwed onto a lifting rod 52 which is likewise slideably guided in a bore of the housing cover 42 and carries a piston 53 which is slideably displaceable in a blind bore 54. The lifting rod 52 is within the blind bore 54 surrounded by a pressure spring 55 which is supported by the piston 53 and the housing cover 42. The connecting rod 39 is within a guiding bore 56 in which the guiding rod 37 slides likewise surrounded by a pressure spring 57 which is supported by the guiding rod 37 and the housing cover 42. The position shown in FIG. 10 corresponds to the position of the welding head between two longitudinal wires while the bearing 43 rests upon the abutment 48A. The bearing block 46 in this position rests on the housing cover 42 so that the two springs 55 and 57 are under no load. As soon as the contact electrode 16 moves onto the contact element 18 (FIG. 5), the guiding rod 37 is moved into the housing 41 so that the adjusting rod 39 is displaced outwardly, and the bearing 43 is lifted off the abutment 48A. Inasmuch as the welding electrode 17 in this position is by the wires 15 and 3 supported by the support 19 (see FIG. 5), the lever 45 pivots about the joints on the bearing 44 while the bearing block 46 is likewise lifted off the housing cover 42. In view of the movement of the piston 53 and the guiding rod 37, the pertaining springs 55 and 57 are compressed, and the pressure of the spring 55 is through the intervention of the bearing 44, the adjusting rod 40, and the guiding rod 38, conveyed onto the welding electrode 17. The thus obtained contact pressure is therefore dependent on the stroke of the contact electrode 16. As soon as the contact electrode 16 has left the contact element 18, it is moved back by the spring to its starting position while the bearing 43 strikes the abutment 48A. The abutment action is dampened by the bushing 48 which forms the abutment and which for damping purposes consists of a suitable shock-absorbing material.

The described working operation is also possible when the longitudinal wires are in an inclined position (see FIGS. 6 and 7). This inclined position can be realized by a displacement of the entire system with a corresponding adjustment of the bearing 43 and/or the bearing 44.

Figure 13:
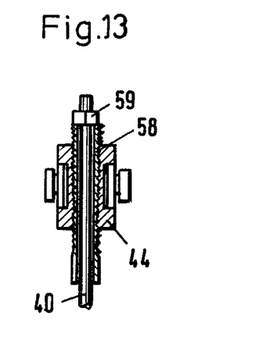
FIG. 13 represents a section taken along the line XIII-XIII of FIG. 12.

The embodiment of FIG. 12 differs from that of FIG. 10 in that the bearing block 46 is for instance by welding rigidly connected to the housing cover 42, and while the abutment rod 40 is guided in a bushing 48 which is connected to the bearing 44. The connecting rod 40 is passed through the bushing 58 in upward direction and carries a nut 59 which rests on bushing 58 (see FIG. 13). The bushing 58 has its inner end provided with a piston-shaped cylindrical extension on which one pressure spring 60 rests which surrounds the adjusting rod 40 and by means of its other end on the guiding rod 38.

FIG. 12 shows the position of the electrodes 9 in FIG. 10, according to which the welding head is located between two longitudinal wires. As soon as the contact electrode 16 moves onto the contact element 18, the guiding rod 37 is displaced against the thrust of spring 57 while the lever 45 is pivoted about its axis 47. Since the location of this pivot axis is not variable with regard to the housing 41, the bearing 44 is during the pivoting of lever 45 displaced in the direction toward the housing while the bushing 58 which is firmly connected to the bearing 44 is carried along. The adjusting rod 40 cannot be displaced in view of the fact that the welding electrode 17 rests on the support 19 (see FIG. 5) so that the spring 60 in view of the displacement of the bushing 58 is compressed. The two springs 57 and 60 therefore bring about the contact pressure of the electrodes which also with this embodiment is independent of the stroke of the contact electrode 16.

Also this system will operate with the longitudinal wires in inclined position (see FIGS. 6 and 7). With this inclined position, the two electrodes are fixed in opposite direction (FIG. 6) or in the same direction (FIG. 7) until they reach the position which corresponds to the inclined position. The relative stroke of the contact electrode 16 will through the springs 57 and 60 create the contact pressure.

With the counter nuts 49 and 50, the position of the bearing 43 and 44 can be adjusted in conformity with the pertaining adjusting rods in order to change the pressure of the springs and thereby the contact pressure.

With all embodiments of the device according to the invention, the guiding path 18A of the contact element 18 extends in the direction of movement of the electrode over a length greater than the length of the stroke during which contact exists between the welding electrodes 17 and the wires 15 and 3. In this way, it will be assured that the contact pressure will already be initiated prior to the start of the welding operation and will be reduced only after the welding operation has been completed.

With all embodiments of the present invention as described above, the electrodes are with regard to the contact element so arranged that the pivoting point of the contact element is located on a plane extending between the two electrodes in the direction of the pressure action (FIGS. 5-7 and 9) so that also when the longitudinal directions are in an inclined position (FIGS. 6 and 7, the uniform contact pressure will be assured on both electrodes.

It is, of course, to be understood that the present invention is by no means limited to the specific showing in the drawings, but also comprises any modifications within the scope of the appended claims.

What is claimed is:

1. The method of making reinforcing grids from weldable wires, especially reinforcing grids for hollow concrete bodies which comprises; moving first wires in circumferentially spaced grouped relation in substantially the direction of the length of the wires, winding a second wire about said group of wires along a substantially helical path, engaging said second wire by a welding electrode, sensing each point intersection of said second wire with a said first wire by a contact electrode adapted electrically to engage the respective first wire, exerting pressure on said welding electrode at each said point of intersection of said wires while supplying welding current to said electrodes, and relieving said welding electrode from pressure during movement thereof along said second wire between points of intersection of said second wire with said first wire, the development of pressure on said welding electrode being generated by movement of the contact electrode relative thereto.

2. The method according to claim 1 in which the application of pressure to said welding electrode and the supply of welding current to said electrode is effected simultaneously.

3. The method according to claim 1 in which the electrodes are pressed toward said wires and the pressure is relieved therefrom simultaneously.

4. The method according to claim 1 in which the pressure exerted on said welding electrode is maintained constant during a welding operation.

5. The method according to claim 1 which includes a fluid actuator system interconnecting said electrodes.

6. The method according to claim 6 in which said fluid system is a hydraulic system.

7. The method according to claim 1 in which said first wires are guided so as to be inclined relative to a central axis to the group of first wires during the welding.

* * * * *